United States Patent
Hang et al.

(10) Patent No.: US 11,185,986 B2
(45) Date of Patent: Nov. 30, 2021

(54) ROBOTIC FINGERTIP DESIGN AND GRASPING ON CONTACT PRIMITIVES

(71) Applicant: The Hong Kong University of Science And Technology, Kowloon (HK)

(72) Inventors: Kaiyu Hang, Kowloon (HK); Haoran Song, Kowloon (HK)

(73) Assignee: The Hong Kong University of Science And Technology, Kowloon (HK)

( * ) Notice: Subject to any disclaimer, the term of this patent is extended or adjusted under 35 U.S.C. 154(b) by 185 days.

(21) Appl. No.: 16/192,169

(22) Filed: Nov. 15, 2018

(65) Prior Publication Data
US 2019/0152058 A1 May 23, 2019

Related U.S. Application Data

(60) Provisional application No. 62/707,756, filed on Nov. 17, 2017.

(51) Int. Cl.
*B25J 15/00* (2006.01)
*B25J 9/16* (2006.01)
(Continued)

(52) U.S. Cl.
CPC .......... *B25J 9/1679* (2013.01); *B25J 9/1653* (2013.01); *B25J 9/1669* (2013.01);
(Continued)

(58) Field of Classification Search
CPC ...... B25J 9/1679; B25J 19/007; B25J 9/1653; B25J 9/1669; B25J 15/08; B25J 15/0052;
(Continued)

(56) References Cited

U.S. PATENT DOCUMENTS 7,087,092 B1 * 8/2006 Landsberger ........... A61F 2/583
294/99.1
9,321,176 B1 * 4/2016 Sun ....................... B25J 9/1656
(Continued)

OTHER PUBLICATIONS

Honapardaz, et al., "Finger design automation for industrial robot grippers: A review," Robotics and Autonomous Systems 87 (2017), pp. 104-119.
(Continued)

*Primary Examiner* — B M M Hannan
(74) *Attorney, Agent, or Firm* — Amin, Turocy & Watson, LLP

(57) ABSTRACT

Techniques for fingertip design are disclosed that leverage how most grasp contacts can share a few classes of local geometries. In order to maximize the contact areas for achieving more robust grasps, contact primitives, which represent a set of contacts of similar local geometries, are identified. A uniform cost algorithm, which can be formulated as a decision making process in a tree structure, can be utilized to cluster a set of example grasp contacts into a finite set of one or more contact primitives. Fingertips can be designed by optimization to match the local geometry of each contact primitive, and then fingertips can be 3D printed using soft materials to compensate for optimization residuals. For novel objects, an approach to generate grasp contacts that match the fingertip geometries while together forming stable grasps can be utilized.

20 Claims, 11 Drawing Sheets

(51) Int. Cl.
| | |
|---|---|
| B25J 15/08 | (2006.01) |
| B25J 15/04 | (2006.01) |
| B25J 19/00 | (2006.01) |
| G05B 19/00 | (2006.01) |

(52) U.S. Cl.
CPC ....... *B25J 15/0033* (2013.01); *B25J 15/0052* (2013.01); *B25J 15/0475* (2013.01); *B25J 15/08* (2013.01); *B25J 19/007* (2013.01); *G05B 19/00* (2013.01)

(58) Field of Classification Search
CPC .. B25J 15/0475; B25J 15/0033; B25J 9/1682; B25J 9/1612; B25J 9/1664; B25J 9/1661; B25J 9/1666; B25J 9/1676; G05B 19/00
USPC ................................. 700/245, 250, 253, 257
See application file for complete search history.

(56) References Cited

U.S. PATENT DOCUMENTS

| | | | | |
|---|---|---|---|---|
| 10,275,543 | B1* | 4/2019 | Edsinger | G06F 30/17 |
| 2006/0012198 | A1* | 1/2006 | Hager | B25J 15/0009 |
| | | | | 294/106 |
| 2008/0065359 | A1* | 3/2008 | Rudolph | G06F 30/20 |
| | | | | 703/2 |
| 2008/0143723 | A1* | 6/2008 | Zhou | G06F 16/9024 |
| | | | | 345/440 |
| 2009/0285664 | A1* | 11/2009 | Kim | B25J 9/1612 |
| | | | | 414/730 |
| 2009/0306825 | A1* | 12/2009 | Li | B25J 9/1669 |
| | | | | 700/261 |
| 2012/0007375 | A1* | 1/2012 | Vittor | B25J 15/02 |
| | | | | 294/192 |
| 2014/0097631 | A1* | 4/2014 | Ciocarlie | B25J 15/08 |
| | | | | 294/198 |
| 2014/0346796 | A1* | 11/2014 | Ciocarlie | B25J 15/08 |
| | | | | 294/202 |
| 2015/0242540 | A1* | 8/2015 | Shapiro | G06F 17/10 |
| | | | | 703/2 |
| 2017/0160736 | A1* | 6/2017 | Thomas | G01C 21/20 |
| 2018/0056512 | A1* | 3/2018 | Watts | B25J 9/1612 |
| 2018/0079075 | A1 | 3/2018 | Ciocarlie et al. | |
| 2018/0107175 | A1* | 4/2018 | Ha | B25J 9/1656 |
| 2018/0117773 | A1* | 5/2018 | Odhner | B25J 15/024 |
| 2018/0126547 | A1* | 5/2018 | Corkum | B25J 9/0081 |
| 2019/0210223 | A1* | 7/2019 | Goldberg | G06T 17/10 |

OTHER PUBLICATIONS

Honapardaz, et al., "Generic Automated Multi-function Finger Design," Materials Science and Engineering 157 (2016) 012015 doi:10.1088/1757-899X/157/1/012015, 10 pages.
Song, et al., "Fingertip Surface Optimization for Robust Grasping on Contact Primitives," IEEE Robotics and Automation Letters. Preprint Version. Accepted Dec. 2017, 9 pages.
Honarpardaz et al., "Generic Automated Finger Design", Proceedings of the ASME 2016 International Design Engineering Technical Conferences and Computers and Information in Engineering Conference, Aug. 21-24, 2016, 09 Pages.
Rao et al., "Grasp quality measures: review and performance", DOI 10.1007/s10514-014-9402-3, vol. 38, No. 1, 2015, pp. 65-88.
Bicchi et al., "Robotic Grasping and Contact: A Review", In Proc. IEEE Int. Conf Robotics and Automation, 2000, pp. 348-353.
Bohg et al., "Data-Driven Grasp Synthesis—A Survey", IEEE Transactions on Robotics, vol. 30, No. 2, 2014, pp. 289-309.
Zheng et al., "On computing reliable optimal grasping forces", IEEE Transactions on Robotics, vol. 28, No. 3, Jun. 2012, pp. 619-633.
Ferrari et al.,"Planning Optimal Grasps", IEEE International Conference, May 1992, pp. 2290-2295.
Borst et al., "Calculating hand configurations for precision and pinch grasps", Proceedings of the IEEE/RS International Conference on Intelligent Robots and Systems, 2002, pp. 1553-1559.
Hang et al., "Hierarchical Fingertip Space: A Unified Framework for Grasp Planning and In-Hand Grasp Adaptation", IEEE Transactions on Robotics, vol. 32, No. 4, 2016, 13 pages.
Sundaralingam et al., "Relaxed-Rigidity Constraints: In-Grasp Manipulation using Purely Kinematic Trajectory Optimization", in Robotics: Science and Systems, 2017, 10 Pages.
Bekiroglu et al., "Assessing grasp stability based on learning and haptic data", IEEE Transactions on Robotics, vol. 27, No. 3, Jun. 2011, pp. 616-629.
Roa et al., "Computation of Independent Contact Regions for Grasping 3-D Objects", IEEE Transactions on Robotics, vol. 25, No. 4, Aug. 2009, pp. 839-850.
Rodriguez et al., "From Caging to Grasping", In Robotics: Science and Systems, 2011, 08 Pages.
Santina et al., "Dexterity augmentation on a synergistic hand: the Pisa/IIT SoftHand+", In Proc. IEEE-RAS International Conference Humanoid Robots, 2015, pp. 497-503.
Dai et al., "Synthesis and Optimization of Force Closure Grasps via Sequential Semidefinite Programming", In International Symposium on Robotics Research, 2015, 16 pages.
Liu et al., "A Complete and Efficient Algorithm for Searching 3-D Form-Closure Grasps in the Discrete Domain", IEEE Transactions on Robotics, vol. 20, No. 5, Oct. 2004, pp. 805-816.
Dang et al., "Semantic Grasping: Planning Robotic Grasps Functionally Suitable for an Object Manipulation Task", In Proc. IEEE/RSI Int. Conf Intelligent Robots and Systems, 2012, 7 Pages.
Mahler et al.,"Dex-Net 2.0: Deep Learning to Plan Robust Grasps with Synthetic Point Clouds and Analytic Grasp Metrics", In Robotics: Science and Systems, Aug. 8, 2017, 12 pages.
Hang et al., "Hierarchical Fingertip Space for Multi-fingered Precision Grasping, IEEE/RSJ International Conference on Intelligent Robots and Systems", Sep. 14-18, 2014, pp. 1641-1648.
Miller et al., "Graspit! a versatile simulator for robotic grasping", Automation Magazine, IEEE, vol. 11, No. 4, Dec. 2004, pp. 110-122.
Borst et al., "Grasping the Dice by Dicing the Grasp", In Intelligent Robots and Systems, 2003.(IROS 2003). Proceedings. 2003 IEEE/RS] International Conference on, vol. 4. IEEE, 2003, pp. 3692-3697.
Hang et al., "Friction Coefficients and Grasp Synthesis", In Proc. IEEE/RSJ Int. Conj. Intelligent Robots and Systems, 2013, 07 pages.
Li et al., "Dexterous grasping under shape uncertainty", Robotics and Autonomous Systems, vol. 75, 2016, 13 pages.
Shilane et al., "The Princeton Shape Benchmark", In Proceedings of the Shape Modeling International, 2004, 12 pages.
Hang et al., "A Framework for Optimal Grasp Contact Planning", IEEE Robotics and Automation Letters, vol. 2, No. 2, Apr. 2017, pp. 704-711.
Ketchen et al., The application of cluster analysis in strategic management research: An analysis and critique, vol. 17, No. 6, 1996, pp. 441-458.
Farin et al., "Curves and Surfaces for CAGD", A Practical Guide, 5th ed. San Francisco, CA, USA: Morgan Kaufmann Publishers, 2002, 521 pages.
Bonnans et al., "Numerical Optimization Theoretical and Practical Aspects", Springer-Verlag New York, Inc., May 31, 2006, 148 pages.
Hang et al., "On the Evolution of Fingertip Grasping Manifolds", In Proc. IEEE Int. Conf. Robotics and Automation, 2016, 08 pages.
Sintov et al., "On the Computation of a Common n-finger Robotic Grasp for a Set of Objects" World Academy of Science, Engineering and Technology International Journal of Mechanical and Mechatronics Engineering vol. 7, No. 11, 2013, 7 pages.
Ramon et al. "Multi-fingered Robotic Hand Planner for Object Reconfiguration through a Rolling Contact Evolution Model" 2013 IEEE International Conference on Robotics and Automation (ICRA), Karlsruhe, Germany, May 6-10, 2013, 6 pages.

* cited by examiner

ROBOTIC FINGERTIP DESIGN AND GRASPING ON CONTACT PRIMITIVES

CROSS-REFERENCE TO RELATED APPLICATIONS

The present application claims the benefit of priority to U.S. Provisional Patent Application No. 62/707,756, filed Nov. 17, 2017, and entitled "Fingertip Surface Optimization for Robust Grasping on Contact Primitives," the entirety of which application is hereby incorporated herein by reference.

TECHNICAL FIELD

The present disclosure generally relates to grasping an object by a robot or mechanical device, and in particular, relates to contact-level grasping.

BACKGROUND

Robots can comprise computing and/or mechanical devices. Some robots have articulated arms that can grasp and manipulate objects, such as through the use of mechanical fingertips, which can contact a given object. Some fingertips can have different shapes, which can aid or hinder grasping a particular object, or grasping objects in general.

Grasping is an ability that allows a robot to physically interact with the world. Contact-based grasping, which considers the contacts made by a grasp, has been studied to address various aspects of grasping. Contact modeling is a building block for the research of contact-based grasping. Dependent on a friction and softness at contacts, form or force closure based grasp quality can be calculated in a grasp wrench space.

Contact-level grasping generally allows for the grasping of objects in ways not achieved through other grasping types. Such explicit contact modeling can allow for analytic force calculation, stability estimation, hand configuration computation, and the like. Additionally, as explicit contact modeling can use only the fingertips for grasping, it can be used to pick up small or fragile objects, as well as allow for dexterous in-hand manipulation.

There are many problems with existing grasping techniques, some of which are well known.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed description of the various embodiments that follow in the disclosure.

Described herein are systems, methods, articles of manufacture, and other embodiments or implementations that can be of a fingertip surface optimization for robust grasping on contact primitives.

According to one embodiment, described herein is a method. In some examples, the method can comprise determining, by a system comprising a processor, a set of extracted contact areas, the contact area primitives representing contact geometries between a grasping device and an object. The method can further comprise clustering, by the system from the given set of contact areas, a given number of classes of contact primitives for the same number of fingertip of the grasping device. The method can further comprise grasping, by the system, any kinds of novel objects.

According to one embodiment, described herein is a system. In some examples, the system can comprise a processor, and a memory that stores executable instructions that, when executed by the processor, facilitate performance of operations. These operations can comprise determining a given number of contact primitives, each contact primitives representing a group of contact geometries between a grasping device and objects. These operations can further comprise selecting a first contact primitive for a first fingertip of the grasping device from the group of contact primitives. These operations can further comprise selecting a second contact primitive for a second fingertip of the grasping device from the group of contact primitives. These operations can further comprise grasping the object with designed fingertips by matching the surfaces between object surface and fingertip surface.

According to one embodiment, described herein is a computer-readable storage medium. In some examples, the computer-readable storage medium can comprise instructions that, in response to execution, cause a system comprising a processor to perform operations. These operations can comprise determining a contact primitive, the contact primitive representing a set of similar contact geometries between a grasping device and any objects. These operations can further comprise grasping the object with a first fingertip of the grasping device and a second fingertip of the grasping device, the grasping comprising selecting at least a first contact primitive for the first fingertip to grasp from the local geometry maximally similar to first contact primitive, and selecting at least a second contact primitive for the second fingertip to grasp from the local geometry maximally similar to second contact primitive.

These and other embodiments or implementations are described in more detail below with reference to the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
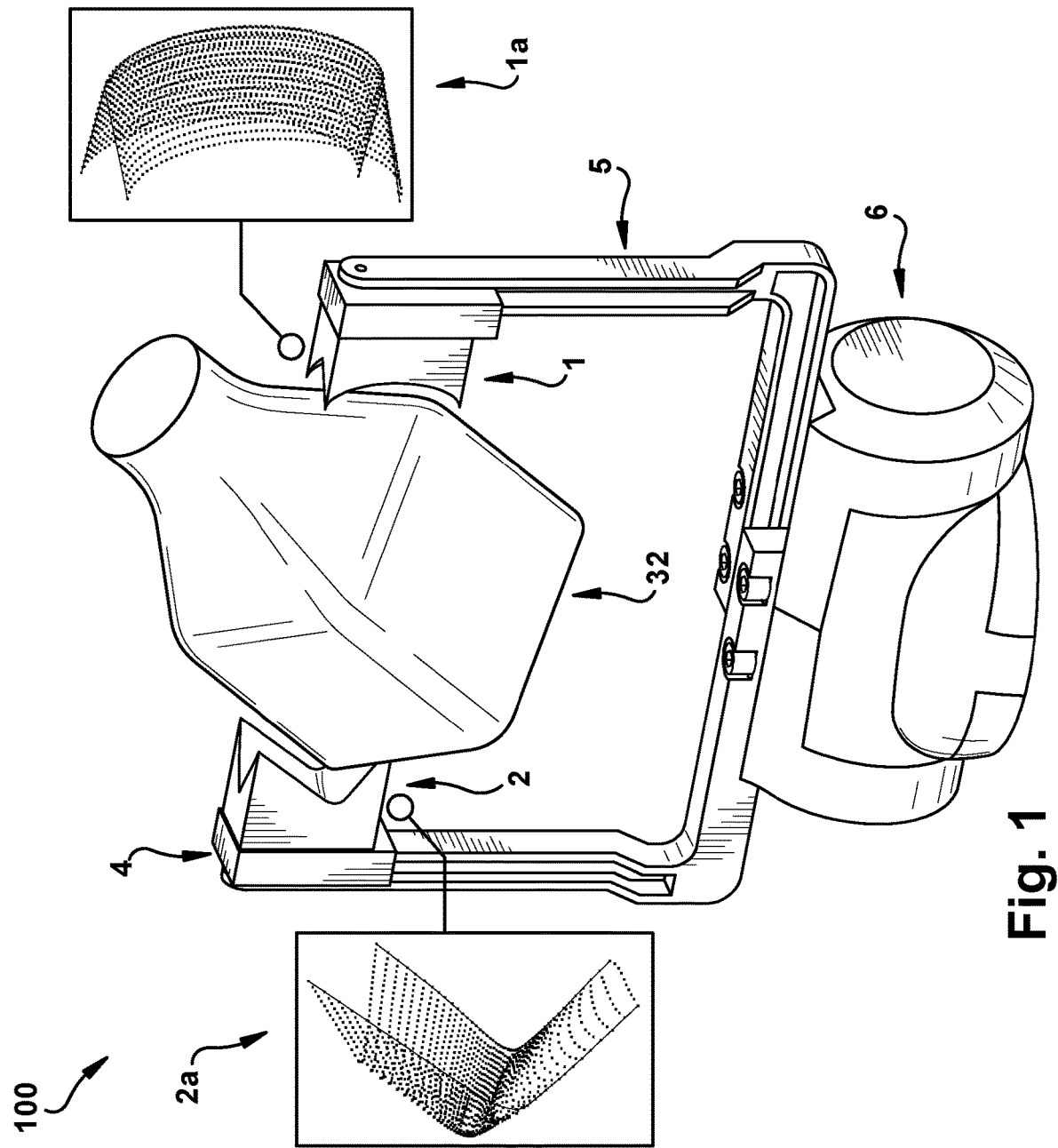
FIG. 1 illustrates an example grasp using two of the designed fingertips.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

Similarly, reference to "an example" means that means that a particular feature, structure, or characteristic described in connection with the embodiment is included in at least one example embodiment. Furthermore, where references are made to "optimizing," "maximizing, "minimizing," or the like, it can be appreciated that there are examples that involve improving, increasing, minimizing, or the like, respectively.

A component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Referring again to grasping objects, the flexibility of contact-level grasping, e.g., in force and kinematics control, can raise challenges for applying such grasps. One such problem can be caused by an unrealistic modeling of point contact used in grasp evaluation, which can falsely indicate a stable grasp configuration that may fail in actual execution. In order to compensate for this type of imprecise contact modeling, tactile feedback can be used to predict grasp stability online after a grasp is executed. By modeling the grasping dynamics in the object-level frame, tactile feedback can also be adopted for online force regulation and finger gaiting. In order to avoid a potential failure caused by positioning errors, independent contact regions can be used to introduce positioning tolerance. Moreover, cage grasping can be used to immobilize objects without requiring precise contact locations.

Regarding hardware design, dexterous underactuated hands can be designed to implicitly reach for contacts and wrap around the object to provide better stability. Additionally, finger design can be carried out to ensure that the fingertips can match the contact local geometries of a few objects, so as to improve grasp stability. However, existing approaches are dedicated to a few pre-defined workpieces and unable to generalize to more objects. In the present techniques, contact areas between fingertips and an object they are grasping can be increased to improve grasp stability by identifying how some grasp contacts share a few classes of local geometries, which can be contacted using a few fingertip designs to maximize the contact areas. Therefore, based on a set of training objects, a concept of "contact primitives" can be defined to represent different classes of contacts. As such, a fingertip design utilizing contact primitives can generalize to more objects, including when fingertips are manufactured using soft materials.

With respect to different task requirements, previous techniques have developed many approaches to generate grasp contacts, and even with associated hand configurations. However, in these previous techniques, the local geometries of contacts are rarely considered. As the present techniques provide an increased amount of contact between fingertips and objects, when encountering novel objects, a hierarchical approach to generate grasp contacts that match the designed fingertip geometries in provided, which also can ensure stable and reachable grasps.

However, in prior techniques, analytic contact modeling can have at least two major issues: a point contact model does not precisely reflect a corresponding real-world physics; and a point contact model can be vulnerable to uncertainties in positioning, friction coefficient, visual perception, and the like.

One approach to counteract such uncertainties can be to use fingertip design to replace a commonly-used flat surface for fingertips. By designing the fingertips to perfectly match the local geometries of contacts, the contact areas between the fingertips and the object being grasped can be increased to improve the grasp stability. Analysis of such approaches indicates that the modeling of contact geometries for fingertip design can improve grasp stability, as well as improve a robustness against uncertainties. However, these prior techniques are not capable of addressing novel objects or a large number of objects.

While objects can possess a large variety of global shapes, it can be observed that many grasp contacts on daily objects share only a few classes of local geometries, such as edges, corners, curved surfaces, and the like. Consequently, what can be referred to as "contact primitives" can be defined to represent a set of similar contact local geometries, and a corresponding fingertip surface can be improved or optimized to increase mimicry of, or maximally mimic, all the local geometries within a given contact primitive. Given a set of training objects with desired grasp contacts, a uniform cost determination can be made, which can be formulated as a decision making process in a tree structure, to first cluster the contacts into a finite set of contact primitives, and then design a fingertip for each contact primitive. The designed fingertips can be 3D printed using soft materials, in order to compensate for an optimization residuals to further increase contact areas.

Moreover, a surface matching based process is provided for grasp planning on novel objects to find contacts that match or approximate the designed fingertip geometries, while providing stable and reachable grasps. FIG. 1, as described below, illustrates an example of two fingertip designs, as well as the generated grasp contacts at the areas corresponding to the contact primitives. For evaluation, and as an example, the designed fingertips are installed on a Baxter robot and show that they are able to grasp a large set of novel objects. Both quantitative results showing that fingertips according to the present techniques significantly improve grasp stability, and qualitative examples indicating that fingertips according to the present techniques can be more robust against uncertainties are provided.

According to the present techniques, a problem of fingertip surface design can be addressed by leveraging how many grasp contacts on daily objects share just a few classes of contact local geometries. As such, for fingertip optimization, first a set of representative contact geometries can be clustered from a set of grasps on example objects, and then the fingertip surfaces can be designed to mimic the shapes of the learned contact geometries. Using the designed fingertips, grasp contacts can be found on an object's surface that can mimic the shapes of the fingertips, so as to improve grasp stability and robustness by increasing grasp contact areas.

A contact primitive can be formally defined, which can be a set of contact areas, to represent a class of similar local geometries. Thereafter, by clustering a set of example contact areas extracted from example grasps, a finite set of contact primitives can be constructed, which can have a minimum sum of in-class differences (or a set of in-class differences), to represent a finite set of contact geometries. For fingertip optimization, a fingertip surface can be modeled by parametric continuous surfaces, and then a set of control points can be determined to reduce or minimize a set of differences between a fingertip surface and corresponding contact areas in the corresponding contact primitive. For grasping novel objects, a hierarchical grasp planner can be utilized to find grasp contacts that can increase (or maximize) contact areas with the designed fingertips, while forming a stable and reachable grasp.

In some examples, this can comprise determining a shape of a first surface of a fingertip to maximize a contact area between a surface of the fingertip and a second surface of an object.

An example approach according to the present techniques has been evaluated on a Baxter robot with parallel grippers. According to the example objects associated with example grasps, three fingertips were designed to cover contact geometries of all extracted local geometries. The evaluation results indicate that these designed fingertips can well-represent the grasp contacts on example objects; can work well for many other novel daily objects; can significantly improve grasp stability in comparison to a baseline of flat fingertips; and can be more robust against uncertainties.

FIG. 1 illustrates an example grasp using two of the designed fingertips, as well as generated grasp contact at areas corresponding to contact primitives. Scene 100 comprises a first designed fingertip 1 (with fingertip surface 1a, represented with a point cloud), a second designed fingertip 2 (with fingertip surface 2a, represented with a point cloud), a customized base 4, a robotic finger 5, and a robotic hand 6.

In some examples, a grasping device is part of a robotic arm, and can comprise fingertip 1, fingertip 2, base, robotic finger 5, and robotic hand 6.

Figure 2:
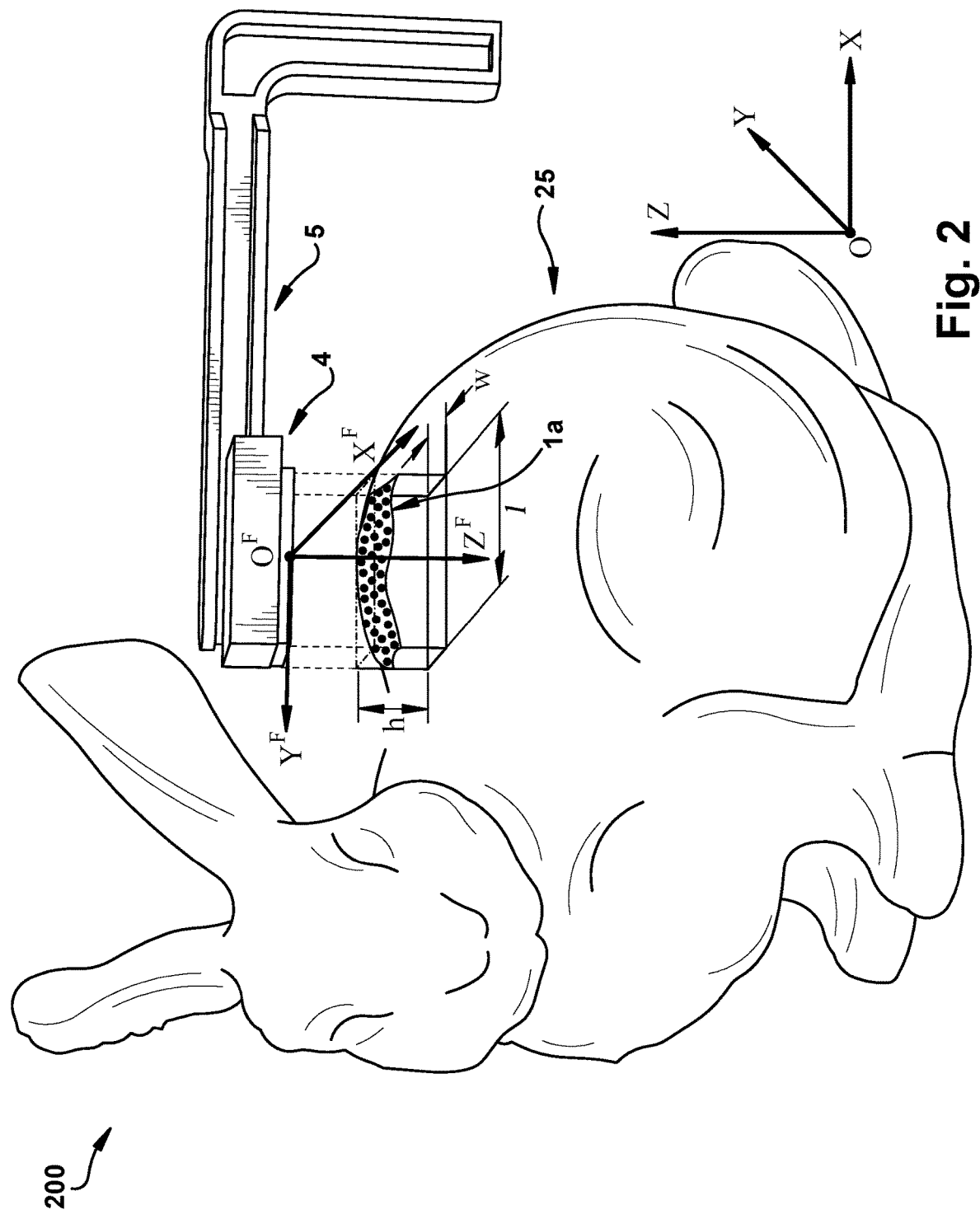
FIG. 2 illustrates an example of contact area extraction and transformation to the fingertip frame.

FIG. 2 illustrates an example of contact area extraction and transformation to the fingertip frame. Scene 200 comprises example object 25, depicted here as a model of a bunny rabbit. Fingertip surface 1a can be formed based on one or more contact primitives. That is, in some examples, contact primitives are based on results of extracted contact areas from example objects.

Contact primitives, as described herein, can be determined. Based on an object point cloud with an example grasp, local contacts can be extracted, and a difference between contacts can be measured. Given a set of extracted contacts from different objects and grasps, an approach to optimally cluster the set into an expected number of classes is provided, with a possibly-minimum sum of in-class differences. The obtained contact classes can yield a definition of contact primitives.

In some examples, determining contact primitives can comprise determining a first contact primitive based on a point cloud determined for at least one contact area associated with the first contact primitive. Determining a fingertip surface design from one contact primitive can further involve parameterizing a point cloud using a continuous 3D surface, resulting in a parameterized point cloud, and determining the first contact primitive based on the parameterized point cloud. This can also comprise determining a geometrical difference between a first surface of the first contact primitive and a second surface of the object; and determining a grasp plan between the first fingertip and the object based on the geometrical difference.

A goal of fingertip design can be to increase (or maximize) the contact areas with respect to fingertip size, and local contacts can be extracted to maximally contain local geometries in relation to a fingertip scale. Concretely, this can be denoted by $P \subset R^3$, a point cloud of an object, and $g=\{(c_1,t_1), \ldots, (c_m,t_m)|c_i \in P, t_i \in S^2\}$, where the m contacts of a grasp g on P, with $t_i$ being the finger pointing direction. A contact area can be defined as $C_i \subset P$, centered at $c_i$. Formally, the contact area can be extracted as:

$$C_i = \{p_i | p_i \in \psi(c_i, t_i) \wedge p_i \in P\} \quad (1)$$

where $\psi(c_i, t_i)$ denotes a cuboid area centered at $c_i$ with width w and length l, which are the width and length of the fingertip. The above equation, as well as in the example equations that follow, are numbered with a parenthetical at the right. For example, the above, labeled with "(1)," can be referred to as Equation (1), or Eq. (1).

Returning to the equation itself, the cuboid area also has a depth h and is oriented to have the $Y^F$ direction aligned with the finger pointing direction $t_i$ and $Z^F$ direction the same as the fingertip's normal. As shown in FIG. 2, the contact area is extracted from P as a projection of the fingertip shape. It can be appreciated that a cuboid shape is used by way of example, and that the above definition of contact primitives can be adapted to arbitrary fingertips and is not limited to a cuboid shape.

It can be seen from the above definition of contact primitives that the contact area can be expressed in the world frame. However, in order to allow the comparison between contact areas, the extracted areas can be oriented so that they align with the fingertip. In other words, if two contact areas are to be compared, they can be aligned in the same orientation as the fingertip contacts them. For this, the extracted $C_i$ can be transformed into the fingertip frame as below:

$$C_i^F = T_F(C_i), \ C_i^F \subset R^3 \quad (2)$$

where $T_F(\cdot)$ is the transformation from the world frame to the fingertip frame. FIG. 2 shows an example of how a contact area is transformed to the fingertip frame.

Having obtained the contact areas from example grasps, the difference between them can be measured. For this, given any two contact areas $C_i^F$ and $C_j^F$ expressed in the fingertip frame, assuming that $|C_i^F| \leq |C_j^F|$, the difference measure can be defined as:

$$\gamma(C_i^F, C_j^F) = \frac{\sum_{p_i \in C_i^F} (p_i^z - p_j^z)^2}{|C_i^F|} \quad (3)$$

where $p_j \in C_j^F$ is the nearest point to $p_i$ in $L^2$ distance, $|C_i^F|$ and $|C_j^F|$ are the cardinalities of the point sets. $p_i^z$ and $p_j^z$ denote the z component of the coordinates.

In some examples, a contact area of a first contact areas between a first fingertip and an object can be extracted based on a side of a hand comprising the first fingertip and a second fingertip.

Figure 3:
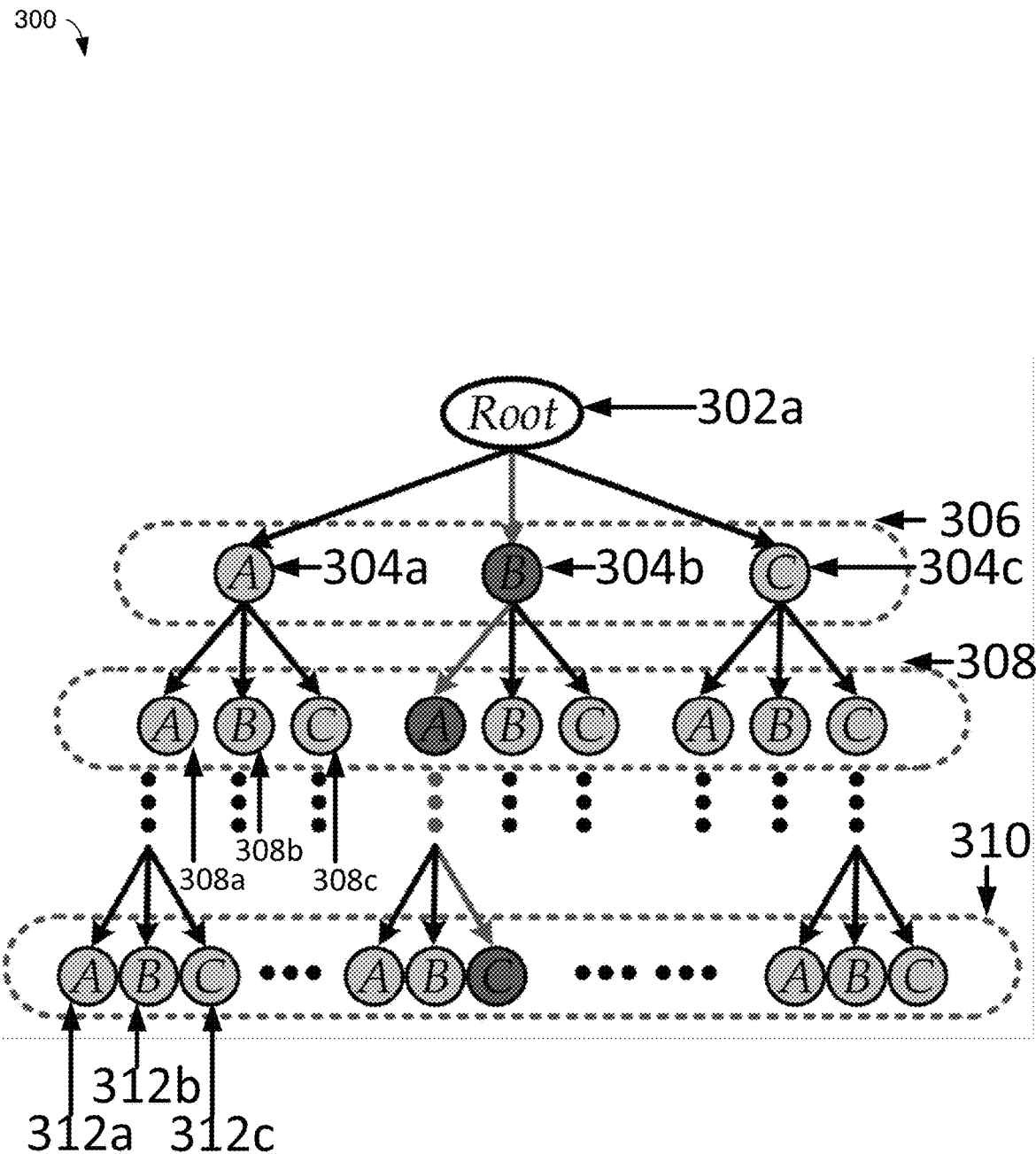
FIG. 3 illustrates an example tree for clustering N contact areas into three contact primitives: A, B and C.

FIG. 3 illustrates an example tree for clustering N contact areas into three contact primitives: A, B and C. As depicted, tree 300 comprises an arbitrary number of levels, with four levels shown here—root 302a (which serves as its own level), level 306 (which comprises nodes, including node 304a, node 304b, and node 304c), level 308 (which comprises nodes, including node 308a, node 308b, and node 308c), and level 310 (which comprises nodes, including node 312a, node 312b, and node 312c).

In order to guide the fingertip design, geometric properties of contact areas can be acquired. Since it can be observed that many contact areas share a few classes of local geometries, how to obtain and represent the local geometry classes can be determined. Firstly, a set of training objects can be associated with example grasps to produce a set of example contact areas $C = \{C_1^F, \ldots, C_N^F\}$. Based on C, a contact primitive can be defined as follows: A contact primitive $Q_i$ can be a set of local contact areas expressed in the fingertip frame:

$$Q_i \subset C$$
$$\text{s.t. } Q_i \cap Q_j = \varnothing \wedge$$
$$Q_1 \cup Q_2 \cup \ldots \cup Q_K = C$$

where K is the total number of contact primitives.

As can be observed, a contact primitive can be a subset of C, by definition. However, it can be noted that a construction of contact primitives can directly affect a quality of geometric properties represented by them. A poor construction can result in a set of contact areas that are very different from each other, where the set is not able to jointly represent any geometric properties. To mitigate against this issue of construction, C can be clustered into K classes to compose K contact primitives, where a goal of this clustering can be to ensure that the sum of the K in-class differences is reduced or minimized. Formally, the in-class difference can be calculated by:

$$\Gamma(Q_i) = \sum_{\substack{C_j, C_k \in Q_i \\ j \neq k}} \gamma(C_j^F, C_k^F) \quad (4)$$

In order to optimally cluster C, this can be formulated as a decision making process. The clustering process can be represented as a tree as illustrated in FIG. 3. Concretely, the root of the tree can represent a state in which all contact areas are not assigned to any class. Starting from the root, the edges connecting the root and the nodes in layer 1 can be the decisions that assign the first contact area $C_1^F \in C$ to one of the classes. Once a decision is made, the edges connecting the selected node and layer 2 can concern a decision on a class assignment of $C_2^F \in C$.

As this approach progresses, a bottom layer N can be reached, where each contact area can have been assigned to one of the classes. Formally, the tree structure can be written as G=(E,V), where V can represent the set of nodes denoting the current clustering state, while E denotes the edges along which decisions are made. For an edge $e_i \in E$, a cost can be defined as:

$$S(e_i) = \Gamma(v_i^C) - \Gamma(v_i^P) \quad (5)$$

where $v_i^C$ and $v_i^P$ are the child and parent nodes connected by $e_i$. To this end, the contact area clustering problem can be reduced to an optimal path finding problem in G with the root being the start position, while a goal position is one of the leaf nodes. An objective can be to find a path $\pi^* = (\pi_1, \ldots, \pi_N)$ in G, $\pi_i \in E$, such that the sum of the path cost $\Sigma_{\pi_i \in \pi^*} S(\pi_i)$ is minimized.

Once a solution (which can be an optimal solution) is found for this path finding problem, the class assigned to each contact area can be obtained by back-tracing through $\pi^*$. In an example, this can be accomplished using Dijkstra's algorithm (or process), which generally is a uniform cost search algorithm, to solve a reduced optimal path finding problem. Dijkstra's algorithm can have a worst-case time complexity of $O(|E|+|V| \log |V|)$. Denoted by Q a priority queue, in an example, the clustering process can be summarized in the following algorithm expressed in pseudo-code:

```
Input: K, G = (E,V)
Output: π*
    (v_i,Γ(v_i)) ← (v_0, 0) , Q ← ∅
    while v_i is not a leaf do
        for all e_j ∈ v_i.SuccessorEdges( ) do
            Γ(v_j^C) ← Γ(v_i)+S(e_j)
            Q .push (v_j^C,Γ(v_j^C))
        end for
        (v_i,Γ(v_i)) ← Q .pop( )
    end while
    π* = v_i.BackTrace( ) Return Path
```

A uniform cost search algorithm can be referred to as a uniform cost determination, and, in examples, can be performed on a training object with defined grasp contacts. Furthermore, the defined grasp contacts can be clustered into a contact primitive based on performing this uniform cost determination.

To determine a number of classes K, which is a number of contact primitives, an Elbow approach can be employed in terms of the average in-class difference over all contact primitives:

$$W = \frac{\sum_{i=1}^{K} \Gamma(Q_i)}{\sum_{i=1}^{K} |Q_i|(|Q_i| - 1)} \cdot K$$

can be selected at the turning point of the W curve. In example experiments, K can be determined as three or four dependent on the provided training objects and grasps.

Figure 4:
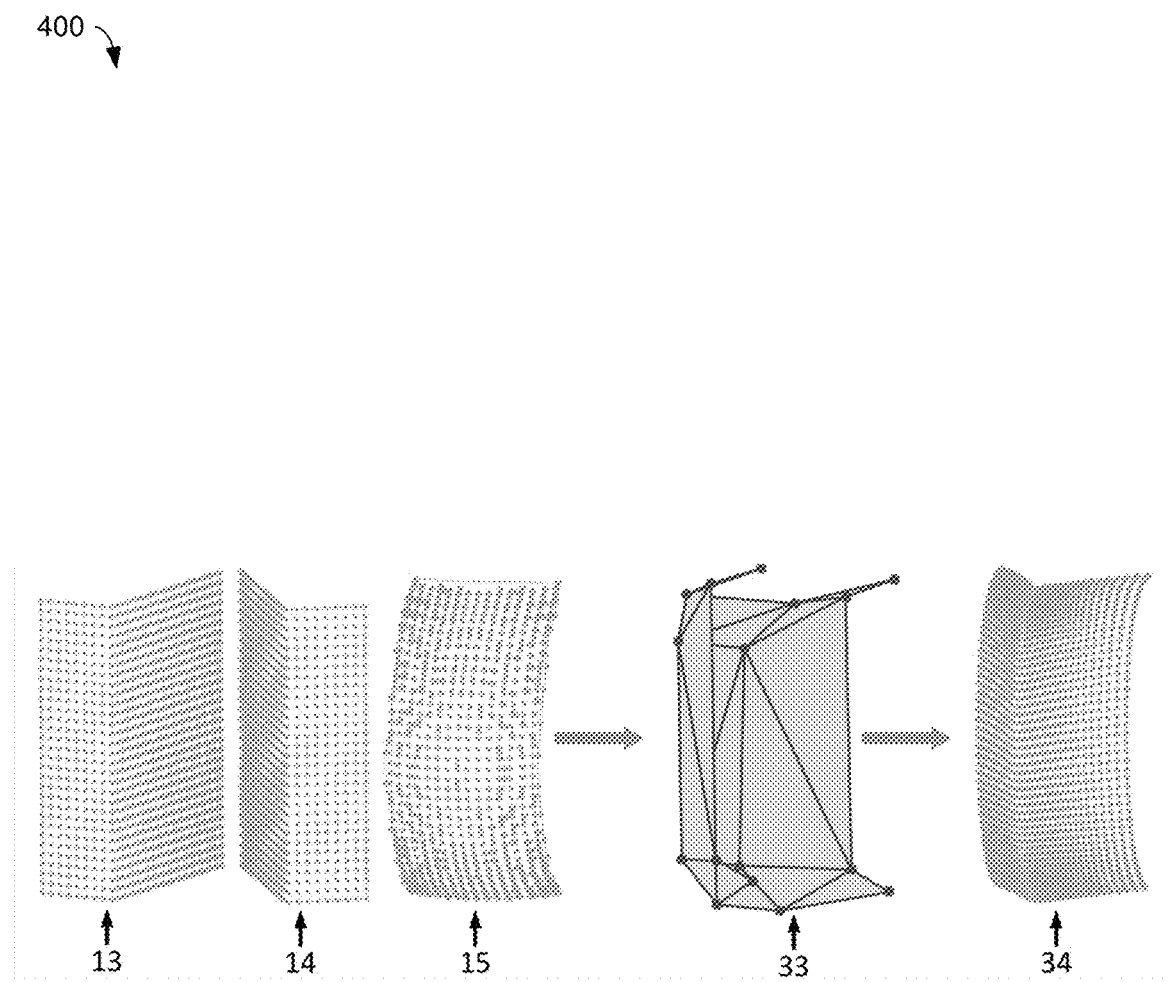
FIG. 4 illustrates an example fingertip design for a contact primitive with three contact areas.

FIG. 4 illustrates an example fingertip design for a contact primitive with three contact areas. Scene 400 three extracted contact areas in the same contact primitive—extracted contact area 13, extracted contact area 14, and extracted contact area 15. Extracted contact area 13, extracted contact area 14, and extracted contact area 15 can be used to form a Bézier surface with extracted control points 33, which in turn, can be used to form a finally obtained Bézier surface 34.

Once the example contact areas C are clustered into contact primitives $\{Q_1, \ldots, Q_K\}$, as the sum of in-class differences are reduced (or minimized), the contact areas contained in each contact primitive can jointly represent a specific type of local contact geometry. Therefore, it can be possible to carry out a fingertip surface optimization for each contact primitive, such that the contact areas between the fingertip and all member contact areas are maximized.

For fingertip optimization, fingertip surfaces can be parametrically modeled using continuous representations, which can be provided by a variety of mathematical tools. As an example, a Bézier surface can be utilized, which is a parametric representation of continuous surfaces, to model the fingertip surface. Briefly, a d-dimensional Bézier surface of degree (m,n) can be determined by the interpolation of a set of (m+1)(n+1) d-dimensional control points $\rho_{ij} \in \rho \subset R^d$, $i \in \{0, 1, \ldots, m\}$, $j \in \{0, 1, \ldots n\}$. For a point $\omega(u,v) \in R^d$ on the surface, the position can be determined by a function of the parametric coordinates u and v varying between 0 and 1:

$$\omega(u, v) = \sum_{i=0}^{m} \sum_{j=0}^{n} B_i^m(u) B_j^n(v) \rho_{ij} \quad (6)$$

where $B_i^m(u)$ is a Bernstein polynomial:

$$B_i^m(u) = \frac{m!}{i!(m-i)!} u^i (1-u)^{m-i} \quad (7)$$

When the parametric coordinate u or v equals to either 0 or 1, the control points can be exactly located at the edges of the bounded surface. As described above with respect to contact area extraction as described in the context of FIG. 2, in terms of the fingertip shape, the contact areas can be extracted within a bounded area of width w and length l, and a corresponding Bézier surface can therefore be bounded by:

$$\rho_{00}^x = \rho_{m0}^x = -\frac{w}{2}, \rho_{0n}^x = \rho_{mn}^x = \frac{w}{2} \quad (8)$$

$$\rho_{00}^y = \rho_{0n}^y = -\frac{l}{2}, \rho_{m0}^y = \rho_{mn}^y = \frac{l}{2}$$

where $\rho_{ij}^x$ and $\rho_{ij}^y$ define the x-coordinate and y-coordinate for boundary control points. As such, a constrained programming problem can be solved to obtain a Bézier surface that maximally mimic a contact area $C_i^F$:

$$\rho^* = \arg\min_\rho \gamma(\tau(\rho), C_i^F) \quad (9)$$

s.t. Eq. (8)

where $\tau(\rho)$ denotes the surface parametrized by $\rho$ and is discretized for the calculation of $\gamma(\bullet)$.

In order to design a fingertip that maximally mimics the geometries in a contact primitive, the surface optimization can make a tradeoff among contained contact areas. A 3D Bézier surface of degree (3,3) can be adopted, which can use 4×4=16 control points to parametrize the surface on a fingertip. Similar to surface optimization for a contact area defined in Equation (9), the surface optimization problem for a contact primitive $Q_j$ can be given by:

$$\rho^* = \arg\min_\rho \sum_{C_i^F \in Q_j} \gamma(\tau(\rho), C_i^F) \quad (10)$$

s.t. Eq. (8)

This constrained programming problem can be solved using Sequential Quadratic Programming. In examples, Sequential Quadratic Programming may not guarantee a global optimal solution, but can be an efficient way to produce satisfactory solutions.

As exemplified in FIG. 4, given a contact primitive consisting of three contact areas (extracted contact area 13, extracted contact area 14, and extracted contact area 15), an optimized Bézier surface 34 can well mimic the geometries to maximize the contact areas. Nevertheless, it can be observed in some examples that there are optimization residuals with respect to each individual contact area. However, described below, the optimized fingertips can be 3D printed using soft materials, so that the optimization residuals can be compensated to make maximal contacts. These soft materials can comprise a deformable material that deforms under grasping pressure.

Figure 5:
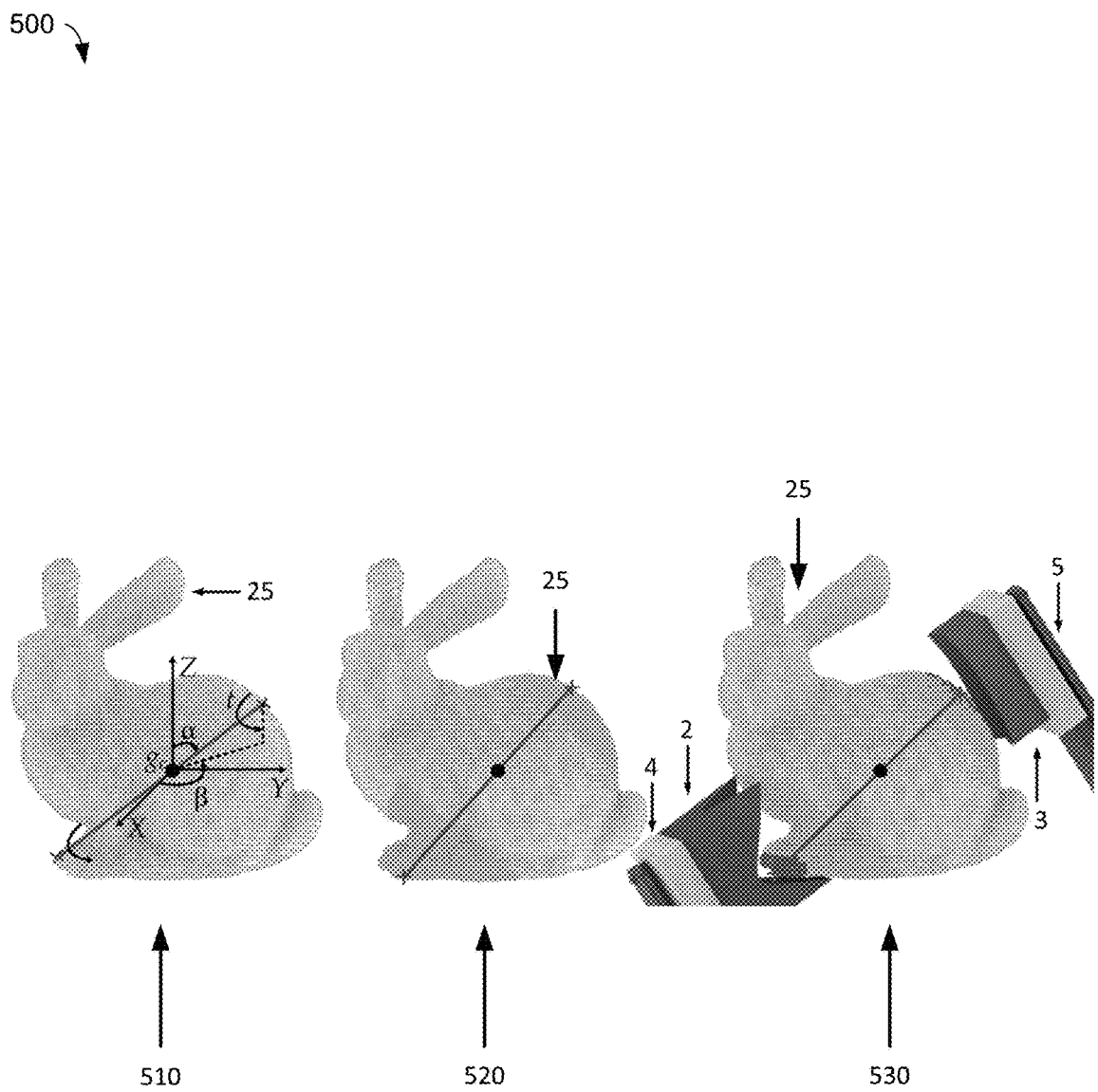
FIG. 5 illustrates an example of hierarchical grasp planning on a bunny model using two different fingertip designs.

FIG. 5 illustrates an example of hierarchical grasp planning on a bunny model using two different fingertip designs. Scene 500 comprises example object 25 at three optimization levels (optimization level 510, optimization level 520, and optimization level 530), with a grasp planning result illustrated in optimization level 530. In optimization level 530, designed fingertip 2 and designed fingertip 3 can be utilized to grasp object 3.

Based on a set of training objects with example grasps, contact primitives $\{Q_1, \ldots Q_K\}$ can be constructed, and a fingertip surface can be optimized for each $Q_i$. The example grasps can be well executed using the example designed fingertips. However, since many grasp contacts share these identified classes of contact geometries, the designed fingertips can be generalized for grasping novel objects. To this end, in terms of the fingertip designs, a grasp planning approach can be provided to find grasp contacts that maximally match the fingertip geometries, while forming a stable and kinematically feasible grasp.

For planning contact-based grasping, force closure can be adopted to calculated grasp quality. However, in order to make grasp contacts using the example fingertips, which in some examples are not flat surfaces as on normal hands, the grasp planning can also be constrained by geometry matching. As such, the following considerations can be involved in grasp planning: a stability of the grasp; a kinematic feasibility for the grasp with the adopted hand; and a match between planned contacts and geometries of designed fingertips.

As with FIG. 2, let $g=\{(c_1,t_1), \ldots, (c_m,t_m)|c_i \in P, t_i \in S^2\}$ be the m contacts of a grasp, where $c_i$ is the contact location and $t_i$ is the finger pointing direction. A grasp planning problem can be addressed using a hierarchical fingertip space-based stochastic optimization, for which, in some examples, an additional constraint can be that every grasp candidate is also evaluated for geometric matching. In addition, a hand reachability can be ensured by a grasping manifold.

In this work, an approach utilizing aspects of the present techniques can be evaluated using a 2-fingered gripper on a Baxter robot. Additionally, details are provided below for a grasp planner on parallel grippers. Next, a grasp planner addresses the above considerations that are described for a grasp planning problem.

A stability of contact-based grasping can be evaluated based on force closure properties. However, it can be that a grasp with two contact points can never be force closed. As such, antipodal grasping can be applied as a heuristic to plan stable grasps. Concretely, as there can be two contact locations for such a grasp, a contact candidate can be generated by first generating a grasp center $g_c \in R^3$ around the geometric center of the object point cloud P. As shown in FIG. 5, a grasp candidate $g=\{(c_1,t_1),(c_2,t_2)\}$ can be generated using a ray-shooting method at the two utmost intersections on the object mesh model. For taking into account the finger pointing direction, $t_i$ can also be generated for each grasp. Given the consideration of parallel grippers, $t_1 \equiv t_2$. In the following, t is used to denote the pointing direction of both fingers.

In examples, to ensure that the generated grasp can be reachable by an adopted gripper, let $n_1, n_2 \in S^2$ be the contact normals at $c_1$ and $c_2$, and let $\varepsilon \in R^+$ be a small value, and the following conditions can be satisfied:

$$\Omega_1 \leq Pc_1 - c_2 P \leq \Omega_2$$

$$Pn_1 + n_2 P \leq \varepsilon \quad (11)$$

where $\Omega_1$ and $\Omega_2$ denote minimum and maximum openings of the gripper. The second condition can ensure that contact normals are pointing to each other.

Given a grasp candidate $g=\{(c_1,t_1), (c_2, t_2)\}$, the corresponding contact areas $C_1^F$, $C_2^F$ can be extracted and transformed into the fingertip frame by Equation (1) and Equation (2). In examples, to ensure the geometric matching so as to make the maximal contact areas, the following optimization problem can be solved:

$$(c_1^*, c_2^*, t^*) = \arg\min_{c_1, c_2 \in P, t \in S^2} \gamma(\tau(\rho_1), C_1^F) + \gamma(\tau(\rho_2), C_2^F) \quad (12)$$

In examples, grasp planning can be solved with the aforementioned considerations using hierarchical optimization. As shown in FIG. 5, the grasp center $g_c$ can be randomly sampled in a small range around the geometric center of P. Thereafter, optimization can be carried out in a hierarchical manner. Initially, on the first level of the hierarchical optimization, grasp candidates can be generated by ray-shooting to sweep over a spherical coordinate system, centered at $g_c$, with respect to the angular coordinates $\alpha \in \delta_\alpha$, $\beta \in \delta_\beta$. A finger pointing direction t can be swept over the range of $\delta_t$ around the z-axis in the fingertip frame. Initially, it can be that $$\delta_\alpha, \delta_\beta = \left[-\frac{\pi}{2}, \frac{\pi}{2}\right]$$

and $\delta_t = [-\pi, \pi]$. In the following, $g=(\alpha, \beta, t)$ can denote a grasp represented in spherical coordinates.

In examples, once an optimal solution $g^* = (\alpha^*, \beta^*, t^*)$ is obtained on the first level by solving Equation (12) constrained by Equation (11), the second level can be entered to conduct finer optimization. For this, a factor $\kappa \in N$ can be introduced to reduce the search range to be more focused around $g^*$. Concretely, around the optimal solution $g^*$ obtained from the first level, the sweeping range can be reduced to $$\delta_\alpha = \left[-\frac{\pi}{2\kappa} + \alpha^*, \frac{\pi}{2\kappa} + \alpha^*\right], \delta_\beta = \left[-\frac{\pi}{2\kappa} + \beta^*, \frac{\pi}{2\kappa} + \beta^*\right] \text{ and}$$

$$\delta_t = \left[-\frac{\pi}{\kappa} + t^*, \frac{\pi}{\kappa} + t^*\right].$$

Following this process, a final optimal solution can be obtained at the predetermined bottom level L. linspace($\delta$, iter) can denote a function that divides the search range $\delta$ into iter search steps, by $(c_1, c_2) \leftarrow \text{getContacts}(P, \alpha, \beta)$, a function that gets the intersections at $(\alpha, \beta)$ and by $(C_1^F, C_2^F) \leftarrow \text{extractAreas}(P, c_1, c_2, t)$, a function that extracts contact areas at $(c_1, c_2, t)$ from P. Given a novel object P, this optimization process can be detailed, for example in the following algorithm that is expressed in pseudo code (and evaluated below):

Input: $\tau(\rho_1), \tau(\rho_2)$, P, iter, $\kappa$, $\Omega_1$, $\Omega_2$, $\varepsilon$
Output: $g = (\alpha^*, \beta^*, t^*)$
cost* $\leftarrow \infty$, $(\alpha^*, \beta^*, t^*) \leftarrow (0, 0, 0)$
for l in $\{1, \ldots, L\}$ do $$\delta_\alpha \leftarrow \left[-\frac{\pi}{2\kappa^{l-1}} + \alpha^*, \frac{\pi}{2\kappa^{l-1}} + \alpha^*\right]$$

$$\delta_\beta \leftarrow \left[-\frac{\pi}{2\kappa^{l-1}} + \beta^*, \frac{\pi}{2\kappa^{l-1}} + \beta^*\right]$$

$$\delta_t \leftarrow \left[-\frac{\pi}{\kappa^{l-1}} + t^*, \frac{\pi}{\kappa^{l-1}} + t^*\right]$$

for $\alpha$ in linspace($\delta_\alpha$, iter) do
  for $\beta$ in linspace($\delta_\beta$, iter) do
    $(c_1, c_2) \leftarrow \text{getContacts}(P, \alpha, \beta)$
    if not $\Omega_1 \leq Pc_1 - c_2 P \leq \Omega_2 \wedge Pn_1 + n_2 P \leq \varepsilon$ then
      continue
  end of
  for t in linspace($\delta_t$, iter) do
    $(C_1^F, C_2^F) \leftarrow \text{extractAreas}(P, c_1, c_2, t)$
    $cost_1 \leftarrow \gamma(\tau(\rho_1), C_1^F) + \gamma(\tau(\rho_2), C_2^F)$
    $cost_2 \leftarrow \gamma(\tau(\rho_1), C_2^F) + \gamma(\tau(\rho_2), C_1^F)$
    cost $\leftarrow \min(cost_1, cost_2)$
    if cost < cost* then -continued $$(\alpha^*, \beta^*, t^*) \leftarrow (\alpha, \beta, t)$$
$$\text{cost}^* \leftarrow \text{cost}$$
end if
end for
end for
end for In some examples, a first contact primitive can be selected using an approach described with respect to FIG. 5. For example, determining a first grasp contact between the object and the first fingertip that matches a first geometry of the first fingertip based on a hierarchical stochastic optimization can be performed, in some examples, based on an approach described with respect to FIG. 5. Additionally, in some examples, determining a second grasp contact between the object and the second fingertip that matches a second geometry of the second fingertip based on the hierarchical stochastic optimization can be performed based on an approach described with respect to FIG. 5.

Figure 6:
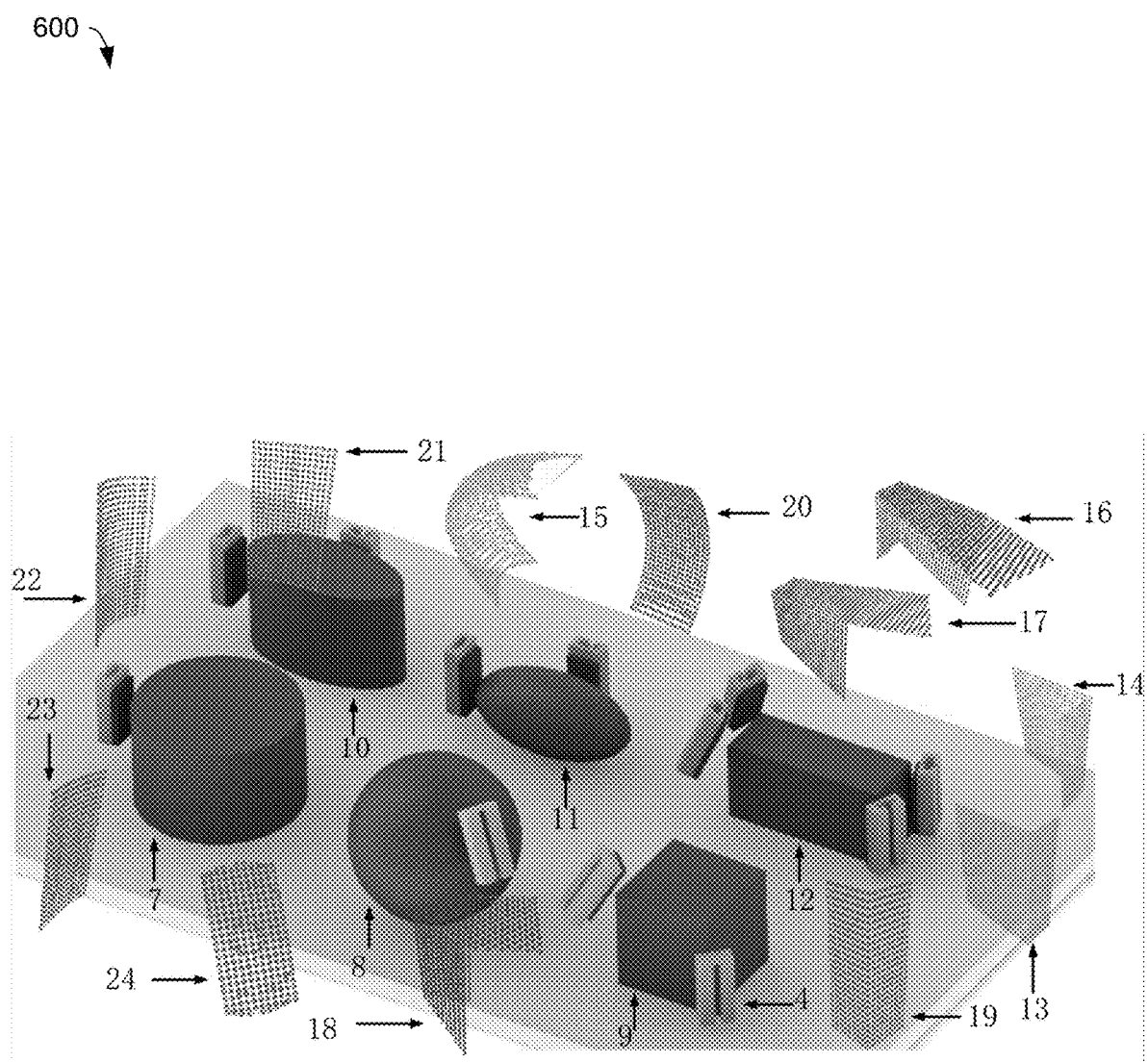
FIG. 6 illustrates example contact areas extracted from training objects associated with example grasps.

FIG. 6 illustrates example contact areas extracted from training objects associated with example grasps. Scene 600 comprises contact area 13, contact area 14, contact area 15, contact area 16, contact area 17, contact area 18, contact area 19, contact area 20, contact area 21, contact area 22, contact area 23, and contact area 24. These depicted contact areas can correspond to, and be extracted from, training objects, which are depicted as training object 7, training object 8, training object 9, training object 10, training object 11, and training object 12.

Contact area 13, contact area 14, and contact area 15 can together comprise a contact primitive. Contact area 16, contact area 17, and contact area 18 can together comprise a contact primitive. Contact area 19, contact area 20, contact area 21, contact area 22, contact area 23, and contact area 24 can together comprise a contact primitive.

In examples, approaches according to aspects of the present techniques can be evaluated from perspectives: contact primitives construction described with respect to FIG. 3 can be quantitatively evaluated; fingertip designs using the grasp planning algorithm described with respect to FIG. 5 can be quantitatively evaluated, and grasp stability provided by fingertip designs in accordance with the present techniques can be tested against a baseline of normal flat fingertips; and designs in accordance with the present techniques can be shown to be more robust against uncertainties. In these example experiments, a Baxter robot is utilized that is equipped with a parallel gripper.

To construct contact primitives for guiding fingertip designs in accordance with the present techniques, a set of 6 training objects can be adopted, which are simple shape primitives, associated with example grasps for contact areas extraction. As depicted in the example of FIG. 6, 12 contact areas (contact areas 13-24) are extracted to cover a variety of local contact geometries.

In some examples, a fingertip (e.g., fingertip 1) can be generated based on at least one graspable contact area between the fingertip and at least one arbitrary object (e.g., object 7) determined to have a same contact primitive as a contact primitive used to generate the fingertip. In some examples, a size of a group of fingertips that comprises a first fingertip and a second fingertip can be determined based on results of example grasps on example objects. That is, a number of fingertips used for a particular grasp on a particular object can be determined.

Figure 7:
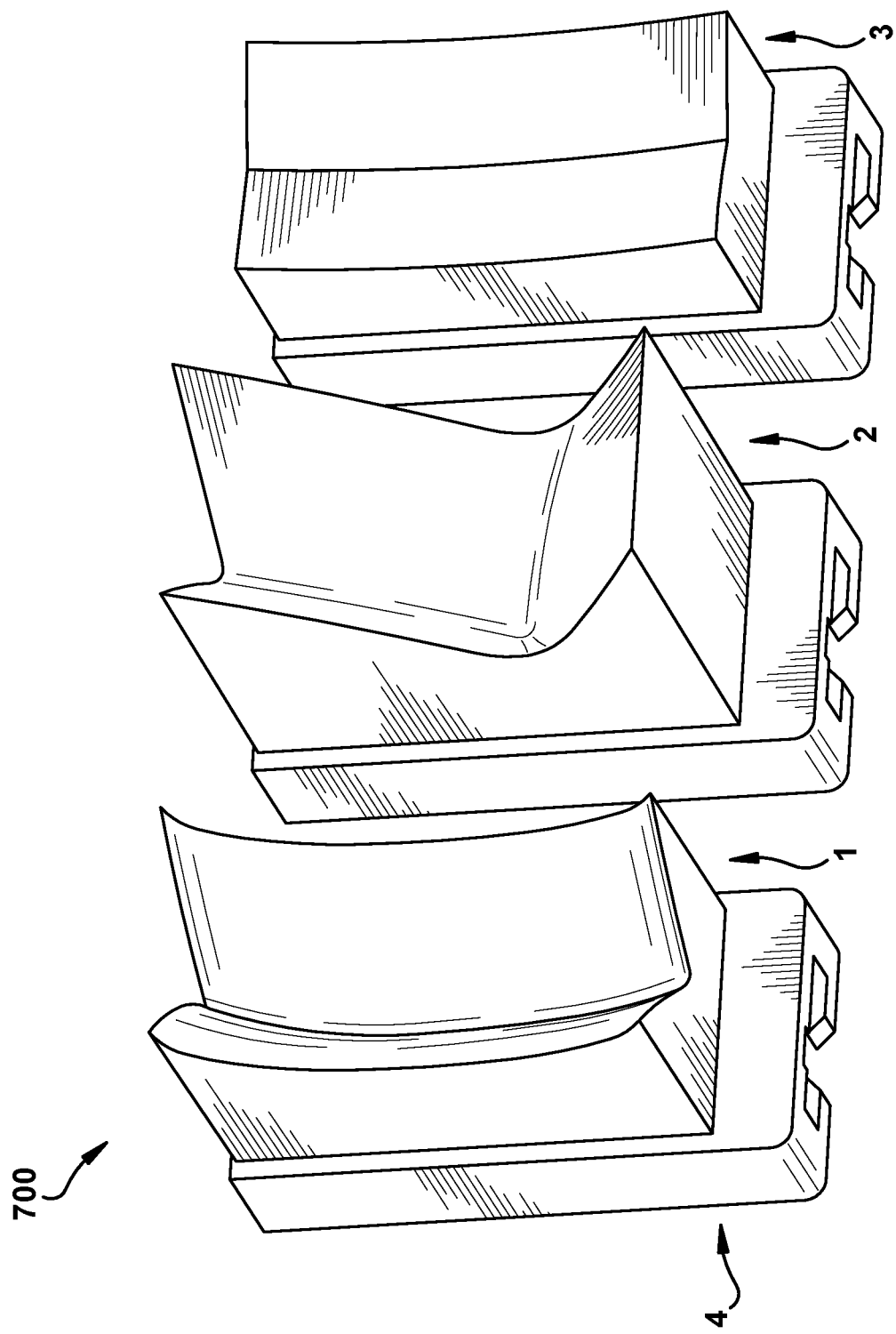
FIG. 7 illustrates fingertip designs for three contact primitives.

FIG. 7 illustrates fingertip designs for three contact primitives. Scene 700 comprises three fingertips—designed fingertip 1 (depicted as attached to base 4), designed fingertip 2, and designed fingertip 3. In some examples, fingertip 1 can comprise contact areas 13-15 of FIG. 6, fingertip 2 can comprise contact areas 16-18 of FIG. 6, and fingertip 3 can comprise contact areas 19-24. As depicted, base 4 can comprise a customized notch is designed for a Baxter's gripper, so that they can be used by plug-and-play.

Once contact areas are extracted, these contact areas can be clustered to construct contact primitives. For this, a number of classes can be determined by Elbow criteria as described with respect to FIG. 3. Consequently, in examples, the contact areas can be clustered into three contact primitives as shown in FIG. 6, and it can be seen that there can be mainly three types of local geometries: edges, corners and curved surfaces. Put another way, a group of contact primitives can comprise an edge of an object, a corner of an object, or a curved surface of an object.

Using the fingertip optimization algorithm in described with respect to FIG. 4, the three fingertips can be designed in terms of the constructed contact primitives as shown in FIG. 7.

Figure 8:
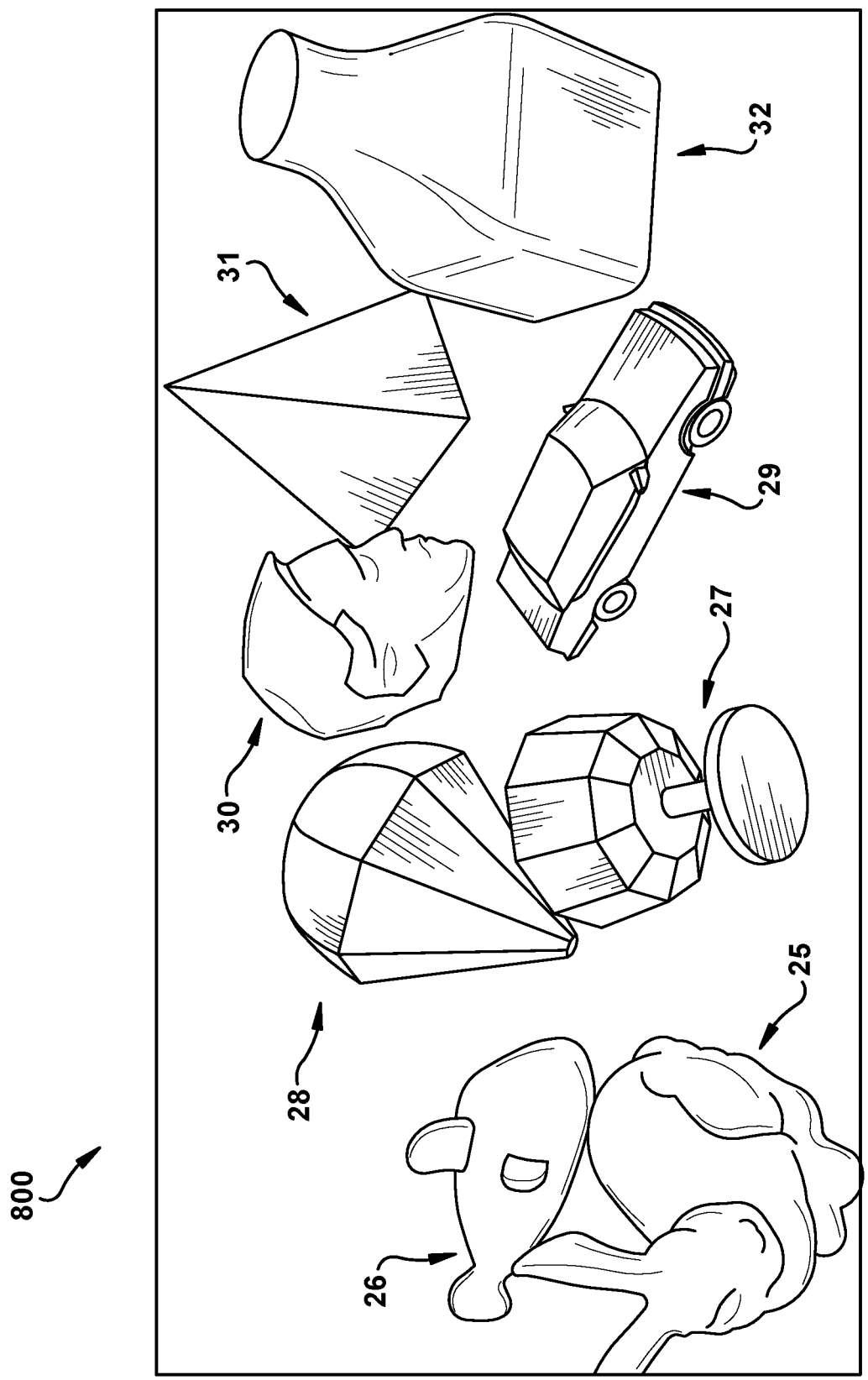
FIG. 8 illustrates eight three-dimensionally (3D) printed test objects used in this work.

FIG. 8 illustrates eight three-dimensionally (3D) printed test objects used in this work. Scene 800 comprises these eight 3D printed test objects—object 25, object 26, object 27, object 28, object 29, object 30, object 31, and object 32. In some examples, objects 25-30 can be downloaded from a Princeton Shape Benchmark library of blueprints for 3D objects.

Having designed the fingertips, the designs can be evaluated based on a set of novel objects shown in FIG. 8. In these examples, three fingertips are designed while only two of them can be installed on Baxter at the same time, so they are shown to be tested by different pairs of two fingertips: I and I, I and II, as well as II and III. As a baseline comparison, a pair of normal flat fingertips can be tested in the experiments described below.

Figure 9:
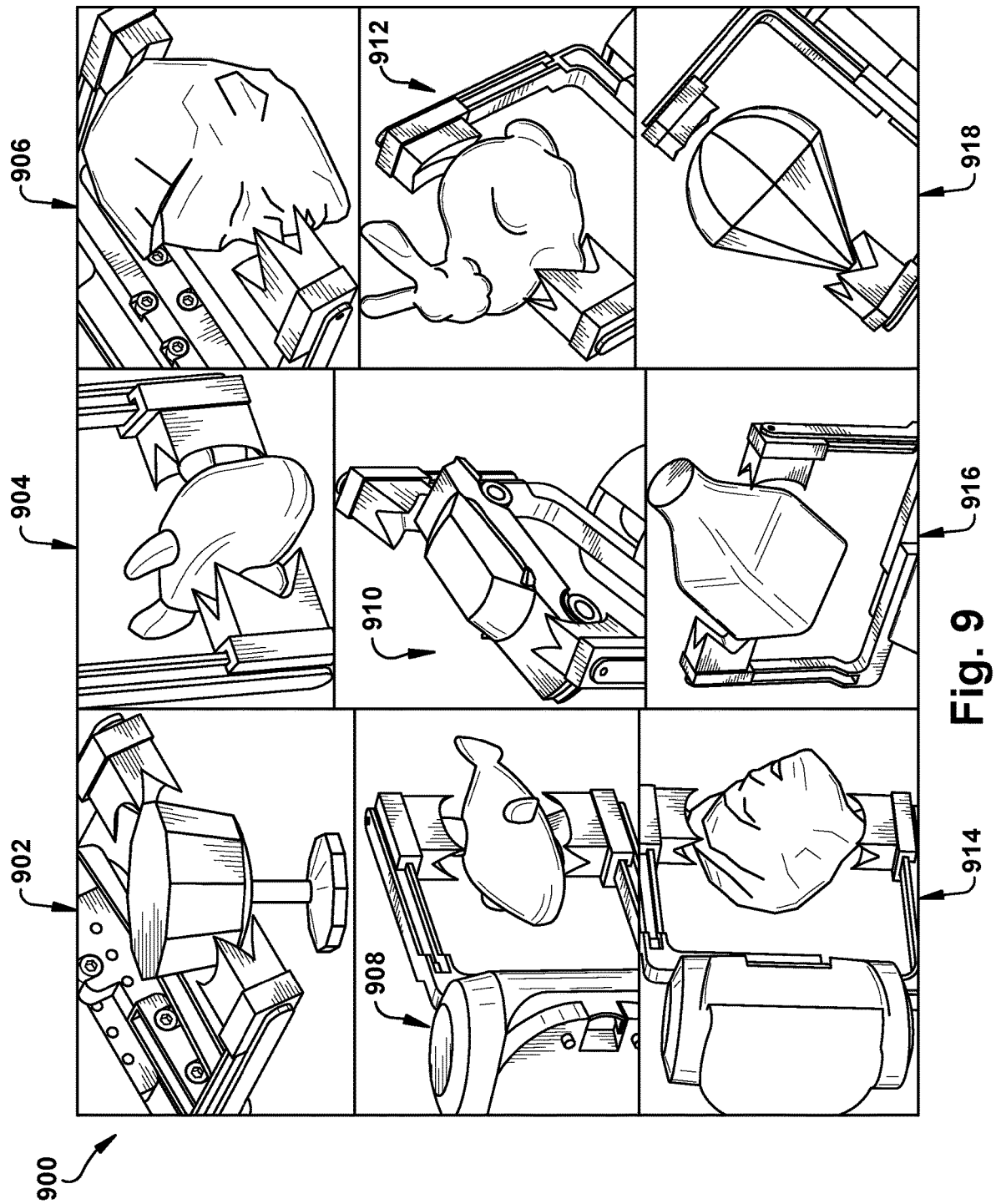
FIG. 9 illustrates example grasp planning results on novel objects.

FIG. 9 illustrates example grasp planning results on novel objects. Scene 900 comprises nine grasp planning results on novel objects—grasp planning result 902, grasp planning result 904, grasp planning result 906, grasp planning result 908, grasp planning result 910, grasp planning result 912, grasp planning result 914, grasp planning result 916, and grasp planning result 918.

For grasping the novel objects, the grasps can be planned using a hierarchical algorithm described with respect to FIG. 5 in terms of the chosen fingertip pair. Some of the grasps planned by the example optimization process algorithm described above using fingertip designs in accordance with the present techniques are shown in FIG. 9. It can be observed that the planned grasp contacts can possess local geometries that are similar to the designed fingertips, independent of which fingertip pair is chosen.

As such, this can indicate that many grasp contacts on daily objects share just a few contact local geometries. This can also be intuitively understood, since all daily objects possess closed shapes, i.e., they do not extend to infinity and their scales are limited. Given those characteristics of daily objects, there then exists local geometries such as edges, corners and curved surfaces at locations on object surfaces. Therefore, given the designed three fingertips, in examples, many shapes can be grasped as long as the object scale fits into an opening range of a corresponding gripper.

Moreover, it can be observed that optimization residuals for flat fingertips can be much lower than those of fingertip designs in accordance with the present techniques. This can be understood as the test objects in these examples have low-curvature areas on their surfaces. Additionally, as can be shown in the following experiments, grasping at flat areas can be weaker in withstanding external forces.

Figure 10:
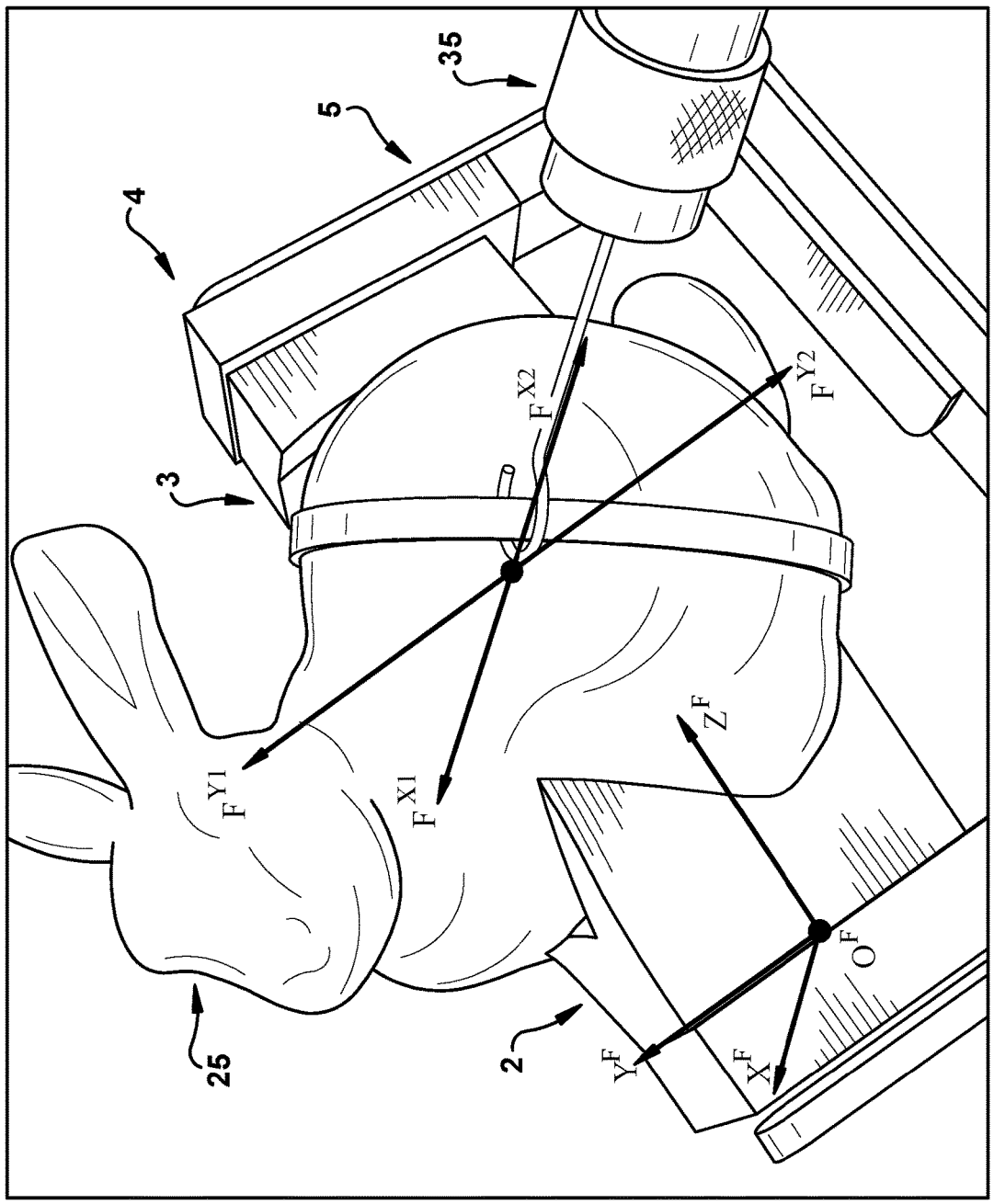
FIG. 10 illustrates a grasp stability test design.

FIG. 10 illustrates a grasp stability test design. The object is grasped according to the plan generated by the example optimization plan algorithm described above. Scene 1000 comprises fingertip 2, fingertip 3, base 4, robotic finger 5, object 25, and dynamometer 35. A stability of the grasp can be measured by a dynamometer 35 to pull object 25 in both positive and negative directions of axes $X^F$ and $Z^F$ in the fingertip frame; and the minimal force which breaks the grasp in one of the four directions can recorded as the stability performance. In case a grasp cannot be broken from any directions up to the dynamometer's limit (which can be 30 newtons (N) in some examples), 30N can be recorded as the result.

In some examples, this stability performance can be referred to as a stability measurement. In some examples, a first grasp contact (e.g., an instance of robotic finger 5 to which fingertip 2 is attached) and a second grasp contact (e.g., an instance of robotic finger 5 to which fingertip 3 is attached) together form a grasp with a stability measurement above a predetermined threshold value. This predetermined threshold value can be a value measured by dynamometer 35, and in some examples can be 20N.

Furthermore, the stability of each example planned grasp can be evaluated on the test objects. The example experiment design is explained in FIG. 10. In this test, the designed fingertips are 3D printed using soft materials to compensate for optimization residuals. To ensure fair comparisons, the flat fingertips are also 3D printed using the same materials. In this experiment, the grasps are planned by the example optimization plan algorithm described above, including the ones using the flat fingertips.

According to the results of this example test, in most of the cases, fingertip designs in accordance with the present techniques significantly outperform the flat fingertips. In some other cases in this example, the flat fingertips performed better, since there are certain objects not suitable for specific fingertip pairs. In this example, object 29, which is a car model, is not be well grasped by a pair of fingertips comprising fingertip 2 and fingertip 3, as there is not an antipodal grasp composed by a corner contact and a curved surface contact.

It can be observed not only that designs in accordance with the present techniques can improve the grasp stability, but also that designs in accordance with the present techniques in many cases can provide grasps that exceed a dynamometer's upper limit, which is larger than the payload of the example Baxter robot (2.2 kilograms (kg)). This is because the grasps using fingertip designs in accordance with the present techniques can form caging grasps, which, in examples, can never be broken unless breaking the fingertips.

Figure 11:
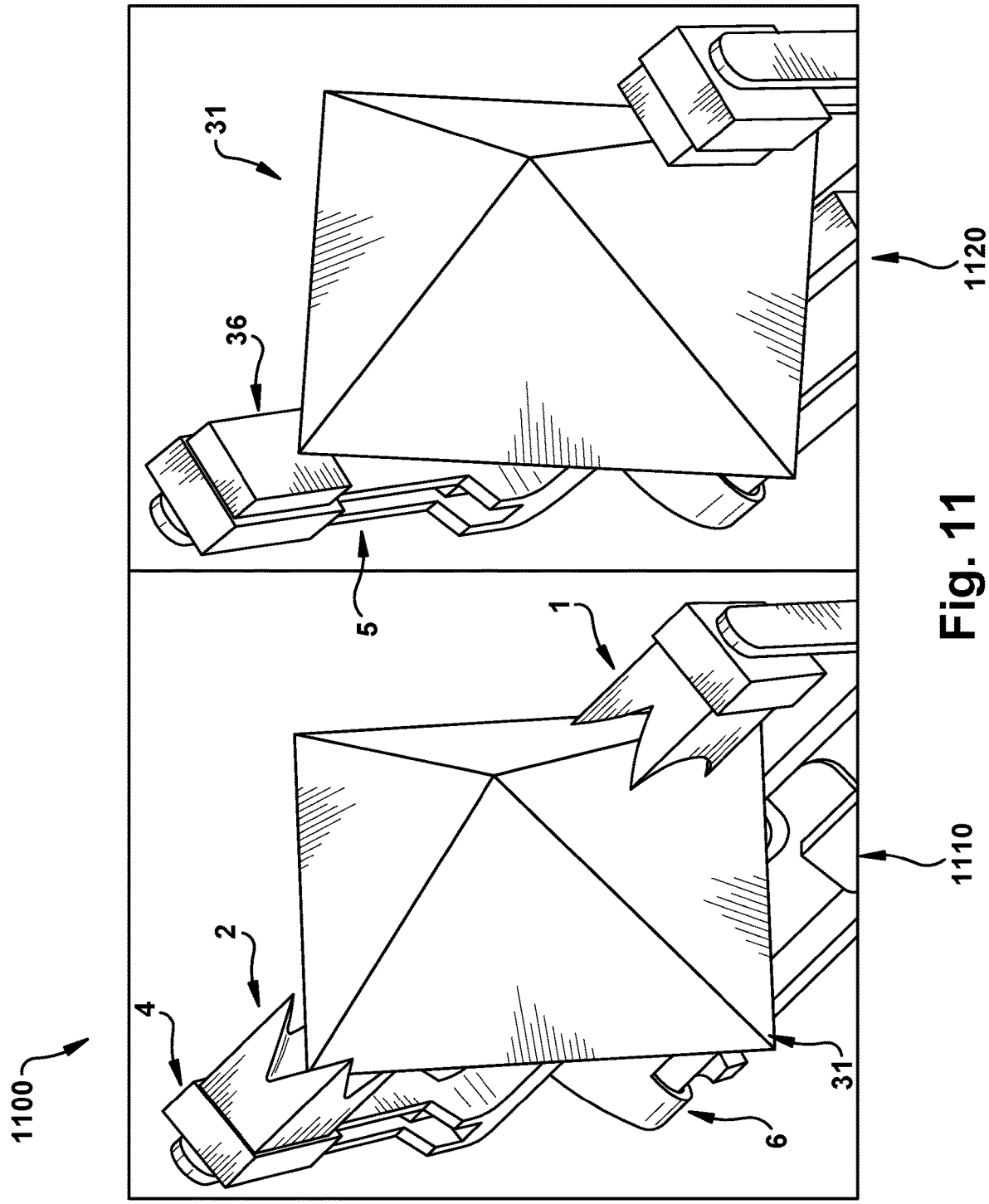
FIG. 11 illustrates an example showing a comparison between example fingertip designs according to the present techniques and normal flat fingertips

FIG. 11 illustrates an example showing a comparison between example fingertip designs according to the present techniques and normal flat fingertips. Scene 1100 comprises a grasp made with fingertip designs according to the present techniques (fingertip 1 and fingertip 2), while scene 1120 comprises a grasp made with normal flat fingertips, such as normal flat fingertip 36. In both scene 1110 and scene 1120, example object 31 is grasped.

In examples, there can be positioning errors due to errors in controller, perception, and the like. For contact-based grasping, positioning errors can be fatal for grasp executions. As shown in the example of FIG. 11, when executing a grasp using flat fingertips with contacts at non-flat areas, a small positioning error can cause a grasp to fail. However, as can be observed, using fingertip designs in accordance with the present techniques can increase a grasp tolerance of positioning errors, since the object can be more constrained, and errors can be corrected by compliant motions.

Additionally, when grasp contacts are made at areas that match the fingertip geometries, designs in accordance with the present techniques can exert forces from a range of positions and directions around a contact center. This can further make the grasps insensitive to friction changes and perception errors, and allow grasp executions in more uncertain environments.

The following aspects are described herein. Contact primitives can be defined to model a set of contact areas of similar local geometries. In some examples, instead of designing dedicated fingertips to grasp a specific object or workpiece, according to the present techniques, fingertips can be designed based on a set of example grasps on example objects to facilitate a robot to grasp a large set of arbitrary objects.

Fingertips can be designed to maximize contact areas for grasping arbitrary objects in order to improve grasp stability. In some examples, this can be done where a target object possesses one or more corresponding contact primitives.

Discrete point clouds can be used to describe contact areas, rather than using computer aided design (CAD) models of contact areas on a specific target object or workpiece. These discrete point clouds can then be parameterized using continuous 3D surfaces for optimization.

In some examples, the surface of fingertips can be optimized using a parametric description. An example of this can involve using a Bézier Surface, to allow for explicit computation of the geometrical differences between the fingertips and a corresponding object's surfaces. This can be useful in both fingertip design and grasp planning.

The shapes of fingertips can be automatically optimized to maximize contact areas between robotic fingertips and corresponding objects to provide more robust grasps. It can be determined how many fingertips need to be designed in terms of example grasps on example objects.

Where there can be optimization residuals in fingertip optimization, fingertips can be fabricated with soft materials to maximize contact areas between a fingertip and a corresponding object.

In some examples, contact areas (which can be referred to as regions of interest) can be extracted from example grasps based on a size of a hand used for the grasp. In some examples, grasp contacts for novel objects can be generated using an efficient hierarchical approach that matches fingertip geometries while together forming stable grasps.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   determining, by a system comprising a processor, a plurality of contact geometries that represent grasp contacts taken on a plurality of objects;
   clustering, by the system, at least two contact geometries of the plurality of contact geometries into a first contact primitive of a set of contact primitives, wherein the clustering comprises generating a first fingertip of at least two fingertips based on at least one graspable contact area between the first fingertip and at least one arbitrary object determined to have a same contact primitive as the first contact primitive; and
   grasping, by the system, an object that is separate from the plurality of objects with at least two fingertips of a set of fingertips of a grasping device, the first fingertip of the at least two fingertips having a shape that is based on the first contact primitive.

2. The method of claim 1, wherein the set of contact primitives is based on results of past grasps of objects.

3. The method of claim 1, wherein the clustering of the at least two contact geometries of the plurality of contact geometries into the first contact primitive of the set of contact primitives comprises:
   determining the set of contact primitives based on a point cloud determined for at least one contact area associated with the set of contact primitives.

4. The method of claim 3, further comprising:
   parameterizing, by the system, the first contact primitive using a continuous three-dimensional (3D) surface.

5. The method of claim 3, further comprising:
   determining, by the system, a geometrical difference between a first contact geometry and a second contact geometry; and
   determining, by the system, a grasp plan between the set of fingertips and the object based on the geometrical difference.

6. The method of claim 1, wherein the first contact primitive of the set of contact primitives represents geometric shapes as contained in a subset of provided grasps.

7. The method of claim 1, further comprising:
   determining a shape of a first surface of the first fingertip of the at least two fingertips to minimize a difference between a first contact area of a surface of the first fingertip and a second surface of the object.

8. A system, comprising:
   a processor; and
   a memory that stores executable instructions that, when executed by the processor, facilitate performance of operations, comprising:
   determining a group of contact primitives, wherein the group of contact primitives represents contact geometries between a first grasping device and at least one object;
   clustering at least two contact geometries of the group of contact primitives into a first contact primitive of the group of contact primitives, wherein the clustering comprises generating a first fingertip of at least two fingertips based on at least one graspable contact area between the first fingertip and at least one arbitrary object determined to have a same contact primitive as the first contact primitive; and
   grasping a first object that is separate from the at least one object with at least two fingertips of the first grasping device or a second grasping device, the first fingertip of the at least two fingertips having a shape that is based on the first contact primitive.

9. The system of claim 8, wherein the group of contact primitives comprises a geometric shape that is found in provided objects for grasping, the geometric shape comprising one of a set of shapes comprising an edge of the first object, a corner of the first object, or a curved surface of the first object.

10. The system of claim 8, wherein the operations further comprise:
    determining a shape of a first surface of the first fingertip of the at least two fingertips to minimize a difference between a first contact area of a surface of the first fingertip and a second surface of the first object.

11. The system of claim 8, wherein the operations further comprise:
    based on results of previous grasps on objects, determining a number of fingertips of the at least two fingertips.

12. The system of claim 8, wherein the operations further comprise:
    extracting a first contact area between the first fingertip of the at least two fingertips and the first object based on a side of a hand comprising the first fingertip and a second fingertip of the at least two fingertips.

13. The system of claim 8, wherein the first grasping device is part of a robotic system.

14. The system of claim 8, wherein the clustering of the at least two contact geometries of the group of contact primitives into the first contact primitive of the group of contact primitives comprises:
    determining a set of contact primitives based on a point cloud determined for at least one contact area associated with the set of contact primitives.

15. A non-transitory computer-readable storage medium comprising instructions that, in response to execution, causes a system comprising a processor to perform operations, comprising:
    determining a plurality of contact geometries between a first grasping device and at least one object;
    clustering the plurality of contact geometries into a set of contact primitives, wherein the clustering comprises generating a first fingertip of at least two fingertips based on at least one graspable contact area between the first fingertip and at least one arbitrary object determined to have a same contact primitive as the first contact primitive; and
    grasping a first object that is separate from the at least one object with a plurality of fingertips of the first grasping device or a second grasping device, a first fingertip of the plurality of fingertips having a shape that is based on the set of contact primitives.

16. The non-transitory computer-readable storage medium of claim 15, further comprising:
    determining a first grasp contact between the first object and the first fingertip of the plurality of fingertips that matches a first geometry of the first fingertip based on a hierarchical stochastic optimization.

17. The non-transitory computer-readable storage medium of claim 16, further comprising:
    determining a second grasp contact between the first object and a second fingertip of the plurality of fingertips that matches a second geometry of the second fingertip based on the hierarchical stochastic optimization.

18. The non-transitory computer-readable storage medium of claim 17, wherein the first grasp contact and the second grasp contact together form a grasp with a stability measurement above a predetermined threshold value.

19. The non-transitory computer-readable storage medium of claim 15, wherein the clustering of the plurality of contact geometries into the set of contact primitives comprises:
performing a uniform cost search determination.

20. The non-transitory computer-readable storage medium of claim 19, wherein the operations further comprise:
determining a shape of the first surface of the first fingertip of the plurality of fingertips to maximize a first contact area between a surface of the first fingertip and a second surface of the first object.

* * * * *